US006563947B1

(12) United States Patent
Droste (10) Patent No.: US 6,563,947 B1
(45) Date of Patent: May 13, 2003

(54) APPLICATION SPECIFIED INTEGRATED CIRCUIT FOR USE IN WAVEFRONT DETECTION

(75) Inventor: Dirk Droste, Edingen (DE)

(73) Assignee: 20/10 Perfect Vision Optische Geraete GmbH, Heidelberg (DE)

( * ) Notice: Subject to any disclaimer, the term of this patent is extended or adjusted under 35 U.S.C. 154(b) by 0 days.

(21) Appl. No.: 09/459,170

(22) Filed: Dec. 10, 1999

(51) Int. Cl.⁷ ................................................ G06K 9/00
(52) U.S. Cl. ................. 382/181; 250/201.9; 250/208.1; 356/125; 382/144; 382/151
(58) Field of Search ................ 250/201.9, 208.1–208.5; 356/121, 124–126; 351/212, 219, 221, 246–247; 382/144, 181, 151, 207, 210, 211, 254–255

(56) References Cited

U.S. PATENT DOCUMENTS

| 4,579,430 A |   | 4/1986 | Bille |
| 4,612,504 A |   | 9/1986 | Pelc |
| 5,233,174 A | * | 8/1993 | Zmek ........................ 250/201.9 |
| 5,825,184 A |   | 10/1998 | Gullapalli et al. |
| 5,936,720 A | * | 8/1999 | Neal et al. ................... 356/121 |
| 5,949,521 A |   | 9/1999 | Williams et al. |
| 6,199,986 B1 | * | 3/2001 | Williams et al. ............. 351/221 |

OTHER PUBLICATIONS

Vittoz et al., CMOS Analog Integrated Circuits Based on Weak Inversion Operation, pp 224–231, Jun. 3, 1997, IEEE Journal of Solid–State Circuits, vol. SC–12, No. 3.
Dreher et al., Active Optical Depth Resolution Improvement of the Laser Tomographic Scanner, pp 804–808, Feb. 15, 1989, Applied Optics, vol. 28, No. 4.
Liang et al., Objective Measurement of Wave Aberrations of the Human Eye with the Use of a Hartmann–Shack Wave–Front Sensor, pp 1949–1957, Jul. 1994, J. Opt. Soc. Am. A, vol. 11, No. 7.
Decker et al., A 256x256 CMOS Imaging Array with Wide Dynamic Range Pixels and Column–Parallel Digital Output, pp 2081–2091, Dec. 1998, IEEE Journal of Solid–State Circuits, vol. 33 No. 12.

* cited by examiner

Primary Examiner—Bhavesh M. Mehta
Assistant Examiner—Gregory Desire
(74) Attorney, Agent, or Firm—Nydegger & Associates (57) ABSTRACT

A device for detecting a wavefront that is defined by a plurality of contiguous light beams includes an array of lenslets for isolating the individual light beams and focusing each individual light beam to a focal point in an x-y plane. The device also has a plurality of clusters which are positioned in the x-y plane, and each cluster includes a plurality of pixels that are arranged in rows aligned in an x-direction, and columns aligned in a y-direction. Additionally, each pixel of a cluster includes both a first photocell for generating an x-signal and a second photocell for generating a y-signal, respectively, in response to an illumination of the pixel by a light beam. Further, the device includes circuitry for converting the x and y signals to digital signals and then using the digital signals to determine an x-y position for the focal point of the particular light beam that is incident on the cluster. A computer then compares the respective x-y positions of the various focal points to detect the wavefront. Depending on the particular application of the device, either photodiodes or phototransistors may be selected for use as the photocells in the pixels.

21 Claims, 5 Drawing Sheets

APPLICATION SPECIFIED INTEGRATED CIRCUIT FOR USE IN WAVEFRONT DETECTION

FIELD OF THE INVENTION

The present invention pertains generally to light wavefront detection devices and their methods of use. More particularly, the present invention pertains to wavefront detection devices that measure deviations between the actual focal points of individual light beams in the wavefront and the idealized focal point of corresponding individual light beams in a plane wavefront. The present invention is particularly, but not exclusively useful for using light beam focal point deviations for the purposes of restructuring, mimicking or otherwise detecting a light wavefront.

BACKGROUND OF THE INVENTION

Wavefront detectors are typically used as measurement systems for detecting the shape of the wavefront that is characterized by a plurality of aberrated light beams. To do this, the phase information of the aberrated light beams, i.e. wavefront, can be described by comparing this information to the phase information of an ideal wavefront which is sometimes called the reference wavefront. For this purpose, the reference wavefront is assumed to have its vertex parallel to the optical axis for each point in a plane. The optical path difference (OPD) between the phase information of the aberrated wavefront and the phase information of the ideal reference wavefront is thus quantified at each point of the reference wavefront. The result is that the wavefront of the aberrated light beams will correspond to the sum of all optical aberrations introduced into this beam while travelling through different optical elements within the optical path. Due to the precise nature of their measurements, wavefront detectors have found numerous applications in areas of optical information processing, especially astronomical research, quality control for optical elements, and ophthalmologic diagnostics.

In most wavefront detection schemes interferometers are used for precise and reliable measurements of optical path differences. An accuracy of several fractions of the used radiation wavelength is achievable using interferometer techniques and this accuracy allows high resolutions in quantification of the wavefront's shape. Different types of interferometers have been invented for this purpose, with the most important being commonly known as the Michelson interferometer. Special redesigns of the Michelson interferometer, however, have been adapted to special measuring purposes. For example, the Mach-Zehnder interferometer or the Saganc interferometer have been widely used. It is common to all types of interferometers that they consist of a system of two optical paths. One path guides a reference wavefront, and the other path contains an element with the optical aberrations that are to be measured. The superposition of the reference wavefront and the aberrated wavefront in an imaging plane then allows the quantification of the amount of aberrations with high accuracy. The disadvantage of this method, however, is the need for two optical paths.

In addition to interferometers, two other type wavefront detection schemes are now offering the possibility of measuring the wavefront's shape by examining images of a single aberrated light beam. One such method uses a back-projection of the point-spread-function (PSF) of the focused light beam to calculate the light beams wavefront before being focused. In this measuring scheme, the intensity distribution of a focal point generated by a lens is examined by use of a CCD camera and a digital signal processing system. By reconstructing the incident light beams wavefront in front of the lens and comparing it to the focal points PSF, the wavefronts shape can be derived.

The second commonly applied detection scheme with image examination is referred to as the Hartmann-Shack detection scheme. For this scheme, the Hartmann-Shack-wavefront sensors use an array of micro-lenses to divide the incident light beam into a matrix of sub-apertures. Each lens then focuses its partial incident light into a focal point. In case of a local tilt of the incident light beams wavefront within the margins of this sub-aperture, the focal point emerges at a deviation perpendicular to the optical axis. The amount of this deviation, in first order, is proportional to the amount of the local tilt of the wavefront. Thus, this tilt can be quantified. A measurement of all focal point deviations in a wavefront allows the reconstruction of the global wavefront's shape by use of a least-square-fit method for calculation. This results in a mathematical standard description of the OPD with respect to a reference wavefront by use of high order polynomials.

The basic Hartmann test has been commonly used to measure the surface quality of primary mirrors in astronomical telescopes as they are polished. To do this, a pinhole is placed in the entrance pupil of a lens of high quality. The pinhole is then movable perpendicular to the optical axis to cover every point within the apertures area. Consequently, the wavefront of the incident light beam is divided into a number of sampling points. For each point, the image of the pinhole will result in a focal point on the image plane of the lens and a local tilt of the wavefront within the pinhole will cause a deviation of the focal point perpendicular to the optical axis. As indicated above, this deviation is measurable.

To overcome the critical time limitations of the former described Hartmann-test, a parallel use was invented by Dr. Roland Shack of the University of Arizona's Optical Sciences Center which is now widely referred to as a Hartmann-Shack wavefront detection scheme. Instead of only one pinhole, a number of equidistant micro lenses is used to generate a matrix of focal points on an image plane.

A Hartmann-Shack-Sensor (HSS) commonly includes an optical system for imaging the aberrated light beam onto a lens array, and an image detector for measuring deviations of the resultant focal points. When using micro-lens array having sufficient quality, HSSs can be used in many applications of wavefront measurement. Further, apart from monitoring for quality control of optical elements where only measurements of wavefront shapes are performed, active optics which use HSS are also realizable. For instance, astronomical telescopes usually compensate for atmospherical distortions by using a closed loop active optics which include a Hartmann-Shack-Sensor.

The critical function of an HSS as part of an image system is to measure the amount of the focal points deviations with a sufficient repetition rate and acceptable accuracy. In operation, the image data is transmitted to an image processing system with digital data acquisition possibilities that are able to perform pattern recognition. The matrix of focal points that needs to be examined for intensity distribution and for the center of each focal point, in order to measure the amount of focal point deviation due to a local wavefront tilt, is often extensive. In this regard, standard CCD (charge coupled devices)-cameras are restricted to a frame repetition rate of about 50 Hz Some high performance CCD-systems, however, with the capability of reading out randomly accessible imaging detectors, are capable of repetition rates of several hundred Hz. Nevertheless, even more responsive and more accurate focal point detections are desirable.

The crucial part of focal point deviation detection is the classification of the focal points intensity distribution for the center of each spot. It is commonly known, that the center of the spots are best derived by use of a center of gravity algorithm. This algorithm achieves a high accuracy in position detection despite the cost of the duration of calculation.

SUMMARY OF THE PREFERRED EMBODIMENTS

A device for detecting a wavefront in accordance with the present invention includes an optical means, such as a lenslet array, for separating the wavefront into a plurality of contiguous light beams. The individual light beams are then individually focused by the optical means to a plurality of respective focal points in an x-y plane. As contemplated by the present invention, the optical means that is used for separating the wavefront into the plurality of contiguous light beams, and for then focusing these light beams, can be of a type commonly referred to as a Hartmann-Shack-Sensor (HSS).

For the present invention, an array of clusters are positioned to lie in the x-y plane so that the focal point of each individual light beam will be incident on a respective cluster. More specifically, the clusters are contiguously arranged in rows and columns in the x-y plane. Further, each cluster includes a plurality of pixels which are also aligned in rows and columns. In particular, each row in the cluster has a plurality of pixels that are aligned in the x-direction, and each column has a plurality of pixels that are aligned in the y-direction. Still further, each pixel includes a first photodetector (photocell) that will generate an x-signal in response to an illumination of the pixel by the focal point of a light beam, and each pixel includes a second photodetector (photocell) that will generate a y-signal in response to an illumination of the pixel.

Depending on the size of a light beam's focal point, and the number and size of the pixels that are in a cluster, the actual location of a focal point on the cluster can be determined with good accuracy. For most applications, it is necessary that only about five percent of the pixels in a cluster be illuminated by the focal point of a light beam at any point in time. This is generally sufficient for determining the x-y position of the focal point on the cluster and further, depending upon the location of the particular cluster in the array, the x-y position of a particular focal point can be determined relative to the x-y positions of all other focal points of light beams in the wavefront.

As contemplated by the present invention, the two photodetectors (photocells) which make up each pixel can be either a photodiode type photocell or a phototransistor type photocell. As is well known, various structural configurations are possible for the manufacture of the photodiodes, or the phototransistors, and the selection of a particular type photocell will, for the most part, depend on the particular application that is to be accomplished by the device, and on the wavelengths of the light beams that are to be detected by the device.

In the operation of the device of the present invention, each of the plurality of contiguous light beams that make up the wavefront to be detected is focused onto a respective cluster in the array. The respective "x" and "y" signals thereby generated are first converted into compressed digital signals. These digital signals are then sent to a computer where they are used to determine the actual x-y position of the particular light beam's focal point on the cluster. Similarly, the actual x-y positions of the focal points for all of the contiguous light beams in the wavefront are determined by the computer. Next, these actual x-y positions are compared with the corresponding idealized x-y positions of contiguous light beams in a plane wavefront. These comparisons are then used to determine any deviation there may be between the actual x-y position of a light beam's focal point and a corresponding idealized x-y position for the focal point. Using the deviations for each of the light beam focal points, the actual wavefront that is characteristic of the detected wavefront can be analyzed, reconstructed or otherwise used as desired.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
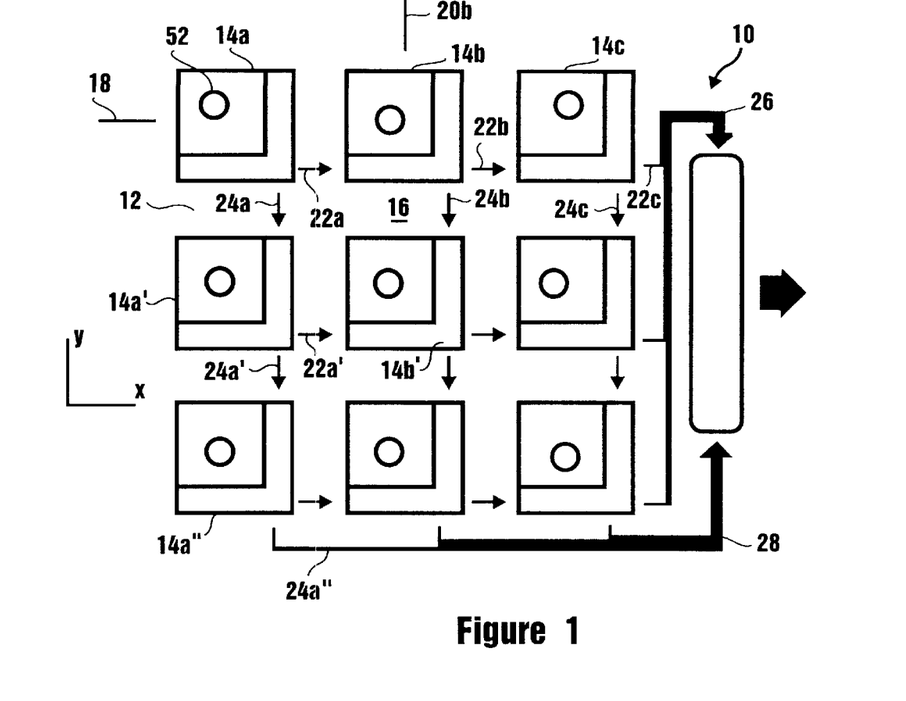
FIG. 1 is a top plan view of an application specified integrated circuit (ASIC) for use in wavefront detection in accordance with the present invention.
Figure 2:
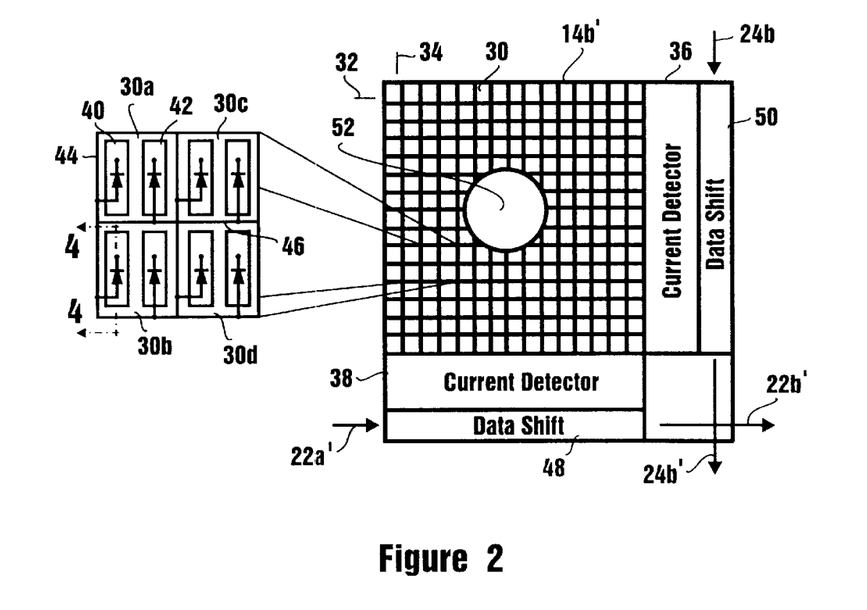
FIG. 2 is a top plan view of a cluster used for the present invention and an enlarged view of several pixels used in the cluster.

Referring initially to FIG. 1 a device in accordance with the present invention is shown and is generally designated 10. For the purposes of the present invention, the device 10 functions as an Application Specific Integrated Circuit (ASIC) which is formed as an array 12 of clusters 14. While the particular device 10 shown in FIG. 1 is shown as a three by three array 12 which includes nine clusters 14, this is only exemplary. Preferably, the device 10 may be as much as a sixteen by sixteen array 12 having two hundred and fifty six clusters 14. In any case, regardless the number of clusters 14, the operation of the device 10 and the function of the individual clusters 14 will remain essentially the same.

As shown in FIG. 1, the array 12 is mounted on a substrate in an x-y plane 16 with the clusters 14 aligned in a plurality of rows 18 and a plurality of columns 20. For purposes of this disclosure the rows 18 from top to bottom are appropriately primed and the columns are identified with lower case letters. Thus, the top row of the array 12 includes the clusters 14a, 14b and 14c, while the left hand column of the array 12 includes the clusters 14a, 14a' and 14a". As also shown in FIG. 1 the various clusters 14 are electronically interconnected. For example, the cluster 14a is electronically interconnected with the cluster 14b by x-data link 22a, and with the cluster 14a' by the y-data link 24a. Also by way of example, it is to be appreciated that the x-data link 22c from cluster 14c is cumulative with x-data link 22b and x-data link 22a. The x-data from all of the rows 18 are likewise cumulative. Therefore, the x-data 26 includes the x-data links 22 of all clusters 14 in the array 12. Similarly, y-data link 24a" includes y-data link 24a' and y-data link 24a, and the y-data 28 includes all of the y-data links 24 in array 12.

The contribution of each cluster 14 to the x-data 26 and y-data 28 from the array 12 will be best appreciated by cross referencing FIGS. 2, 3A–C and 4. First, in FIG. 2, using the cluster 14b' as an example, it can be seen that each cluster 14 includes a plurality of pixels 30 which are arranged as a plurality of rows 32 and a plurality of columns 34. Specifically, the rows 32 extend in the x-direction, and the plurality of columns 34 extend in the y-direction. As shown, all of the rows 32 terminate at a current detector 36 and all of the columns 34 terminate at a current detector 38. Further, still referring to FIG. 2 and using the pixel 30a as an example, it will be appreciated that each pixel 30 includes a pair of photodetectors (photocells) 40 and 42. More specifically, the photodetector 40 is electronically connected to a circuit 44 which will conduct any current that is generated by the photodetector 40 to the current detector 38. Similarly, the current detector 38 receives currents from corresponding photodetectors 40 in all of the pixels 30 in the cluster 14 via respective circuits 44. The information from these respective circuits 44 is then passed by the current detector 38 to a data shift 48 where it is included with the x-data link 22a' from cluster 14a' to create the x-data link 22b'. In a similar manner, any currents that are generated by the photodetectors 42 will be passed via respective circuits 46 to a data shift 50 where they are included with the y-data link 24b from cluster 14b to create the y-data link 24b'.

Figure 3A:
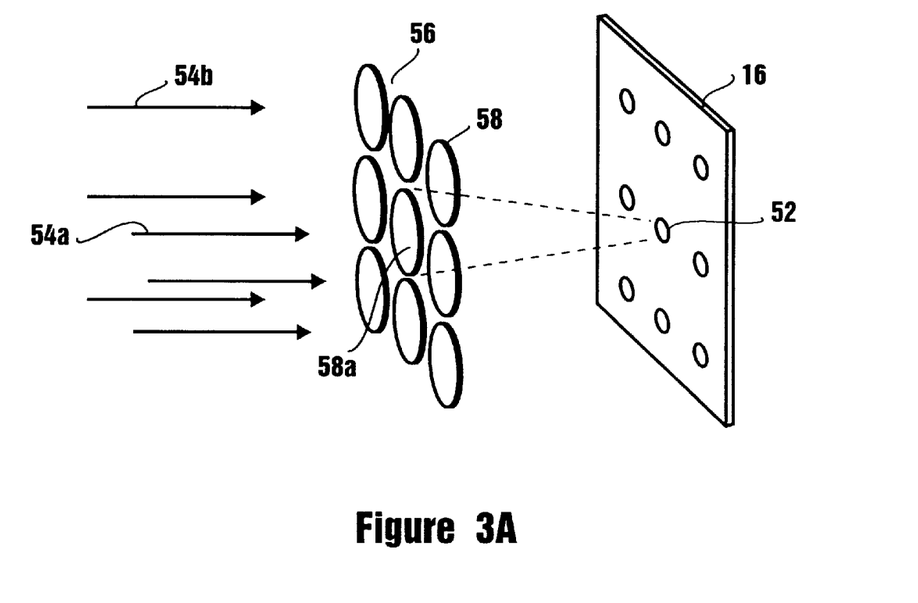
FIG. 3A is a perspective view of a lenslet array shown focusing a representative light beam of a wavefront onto a focal point in an x-y plane.
Figure 3B:
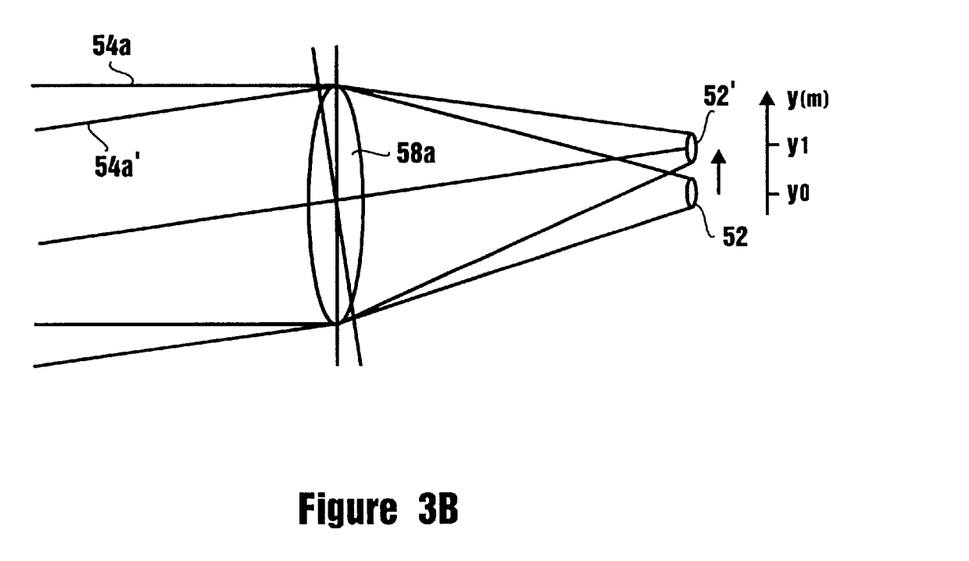
FIG. 3B is a schematic view of a focal point deviation between a light beam of a plane wavefront and a light beam of a distorted wavefront.
Figure 3C:
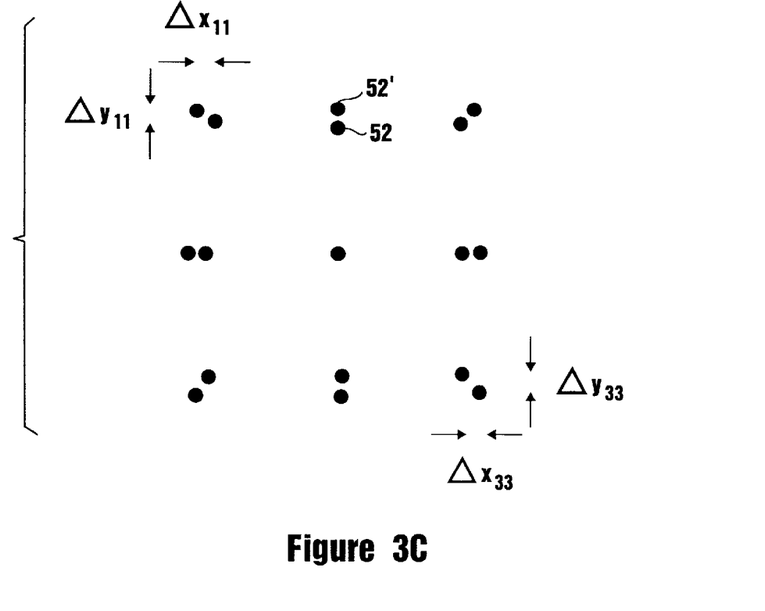
FIG. 3C is a schematic view of a plurality of focal point deviations between a plane wavefront and a distorted wavefront.

In a manner well known in the pertinent art, the currents from photodetectors 40,42 which pass through the respective circuits 44,46 (referred to above) are generated whenever a focal point 52 is incident on a particular photodetector 40 or 42. The utility of this is, perhaps, best appreciated with reference to FIGS. 3A–C. Beginning with FIG. 3A, it is appropriate to consider a wavefront as comprising a plurality of individual light beams 54. For this analysis, consider the plurality of individual light beams 54 (i.e. the entire wavefront) is incident on an array 56 of individual lenslets 58 with each light beam 54 passing through a respective lenslet 58. Specifically, consider the light beam 54a. As Shown in FIG. 3A, the light beam 54a will be focused by the lenslet 58a to a focal point 52 in the x-y plane 16. For continuity of discussion, consider the focal point 52 of light beam 54a is incident on the cluster 14b' in the x-y plane 16. If the wavefront, of which light beam 54a is a part, is a plane wavefront, it can be shown that the focal point 52 will be as substantially shown in FIG. 3B. On the other hand, if the wavefront is not planar and, instead, is somehow aberrated or distorted, the light beam 54a will be altered to react as a light beam 54a' which approaches the lenslet 58a at an angle. The consequence of this is that the focal point 52 (light beam 54a) is shifted to the focal point 52' (light beam 54a'). Such a shift is shown, as an example, in FIGS. 3B and 3C. A similar consequence, of course, results for all of the other individual light beams 54 in the wavefront. As intended for the present invention, shifts in the locations of the focal points 52 in the x-y plane 16 for the respective individual light beams 54 can be used for reconstructing the distorted wavefront. Specifically, the amount of shift of focal points 52 in the x and y directions from their predetermined locations in the x-y plane 16 for a plane wavefront provides information with which the incident wavefront can be reconstructed. For the present invention, this detection of shifts in focal points 52 is done on each of the individual clusters 14.

Figure 4:
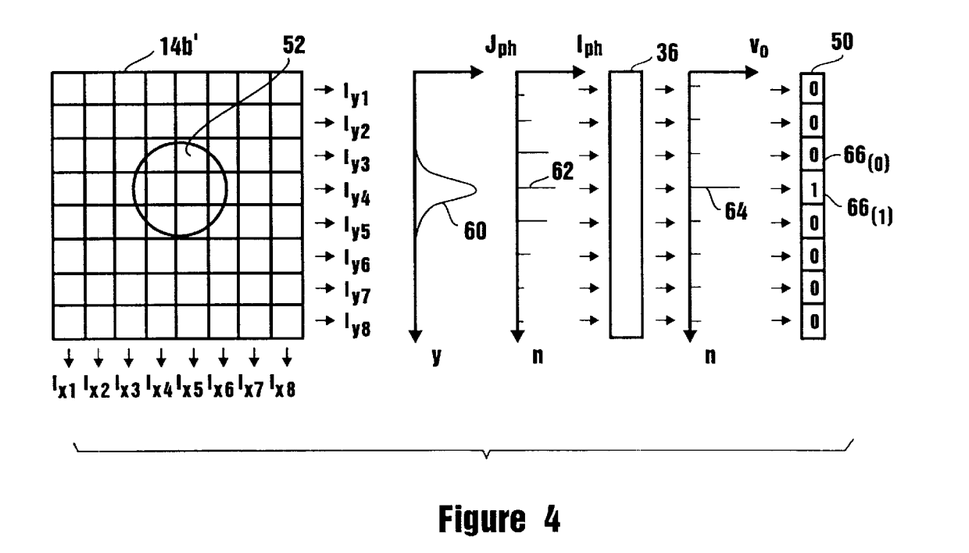
FIG. 4 is a top plan view of a cluster with a light beam focal point incident thereon, together with related graphs depicting signal processing techniques used for determining the x-y position of the focal point on the cluster.

In FIG. 4, the cluster 14b' is again used as an example. As such, in FIG. 4 it will be seen that the focal point 52 is incident on several pixels 30 in the in the x-y plane 16 of the array 12. Actually, the intensity ($J_{ph}$) of focal point 52 has a gaussian distribution which, for the y direction is shown by the intensity curve 60 in FIG. 4. Further, although the focal point 52 is two-dimensional in the x-y plane, as shown, it will be substantially circular. Thus, for purposes of discussion, it is sufficient to consider only the y dimension of focal point 52 and recognize that the x dimension will have similar consequences. Accordingly, consider the photodetector 42 of a pixel 30 in cluster 14b' that is illuminated by the focal point 52. If this photodetector 42 is illuminated by the focal point 52, it will generate a current which, together with all other photodetectors 42 in the same row 32 will generate a responsive current spike 62 (e.g. $I_{y3}$) which will flow through a circuit 46 to the current detector 36. Similarly, for each row 32, a current spike 62 will be generated by all photodetectors 42 in the same row 32 (e.g. $I_{y1}, I_{y2}$ - - - $I_{y8}$). As can be easily appreciated, the magnitude of the current spikes 62, as shown in FIG. 4, will vary according to how many photodetectors 42 in the row 32 are illuminated by the focal point 52. In any event, the current detector 36 compares the current spikes 62 to generate an output signal 64 which is representative of the y coordinate of the focal point 52 on cluster 14b'. As indicated in FIG. 4, the output signal 64 is compressed in the data shift 50 to a binary code. For example, as shown, the current associated with $I_{y3}$ is converted to a null binary digit $66_{(0)}$ while the current associated with $I_{y4}$ is converted to a unit binary digit $66_{(1)}$. Similarly, the currents associated with the various rows 32 are converted into binary signals which are compressed and transmitted from the cluster 14b' as the y-data link 24b'. A similar discussion for the photodetectors 40 in the columns 34 will result in the generation of the x-data link 22b'.

In accordance with the present invention the photodetectors 40, 42 can be any of several types well known in the pertinent art. Specifically, the array 12 and all of the photodetectors 40, 42 and associated circuitry can be fabricated by processing silicon wafers with standard industrial processes. The result is a monolithic integration of photodetectors 40,42 and signal processing circuitry. More specifically, insofar as the photodetectors 40,42 are concerned, several embodiments of photodiodes or phototransistors, such as those shown in FIGS. 5A–E can be employed.

Figure 5A:
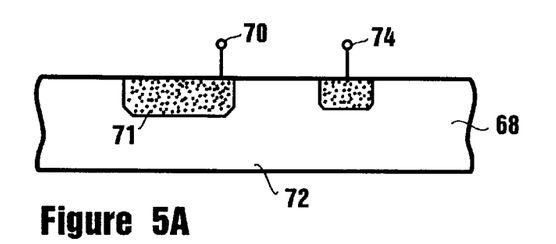
FIGS. 5A–E are a sequence of cross sectional views showing respective structural configurations for various photocells as would be seen along the line 4—4 in FIG. 2.
Figure 5B:
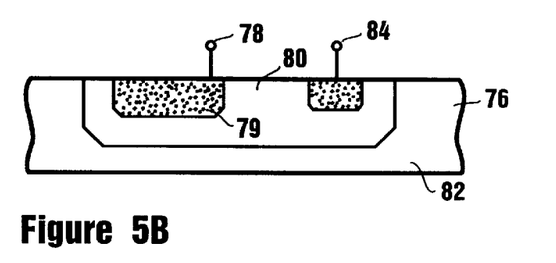
Figure 5C:
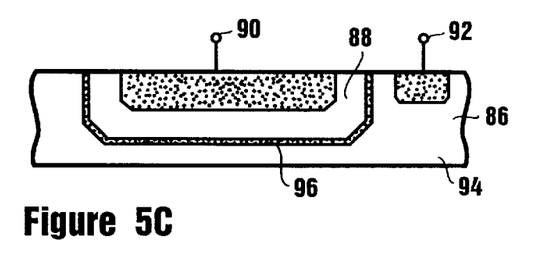

FIG. 5A shows an embodiment for an nplus-photodiode 68 which can be used as a photodetector 40,42. As shown, the nplus-photodiode 68 includes a highly doped n-active cathode 70 which is embedded into a slightly p-doped substrate 72. Also embedded into the substrate 72 is a highly doped p-active anode 74. Photoconversion for the nplus-photodiode 68 occurs due to a reverse polarized voltage within the depletion region 71 between the cathode 70 and the substrate 72. For a slightly different embodiment of the photodetectors 40,42, FIG. 5B shows a pplus-photodiode 76. As shown, the pplus-photodiode 76 has a highly doped p-active anode 78 which is embedded into a slightly doped n-well 80. The n-well 80 is embedded into a slightly p-doped substrate 82, and a highly doped n-active cathode 84, like the anode 78, is embedded into the n-well 80. For the pplus-photodiode 76, photoconversion will take place in the depletion region 79 between the anode 78 and the n-well 80. A third type embodiment for a photodiode which can be used as the photodetectors 40,42 is the nwell-photodiode 86 shown in FIG. 5C. For the nwell-photodiode 86, a slightly doped nwell 88 is provided and a highly doped n-active cathode 90 is embedded into the nwell 88. A highly doped p-active anode 92 is embedded into a slightly p-doped substrate 94 and a depletion region 96 is provide between the nwell 88 and the substrate 94. For the nwell-photodiode, photoconversion takes place in the depletion region 96.

Figure 5D:
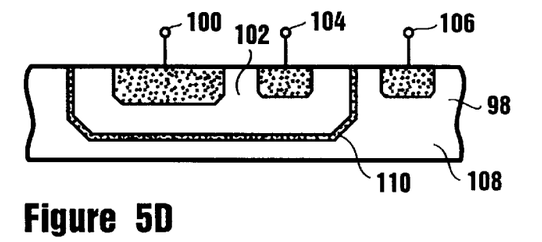
Figure 5E:
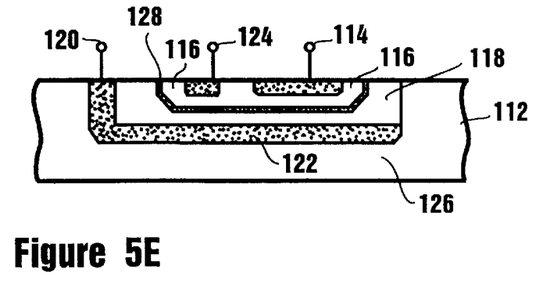

As indicated above, phototransistors may also be used for the photodetectors 40,42. One embodiment for such a phototransistor is a pnp-phototransistor 98 as shown in FIG. 5D. As shown, the pnp-phototransistor 98 includes a highly doped p-active emitter 100 which is embedded into a slightly n-doped nwell 102. A highly doped n-active base 104 can also be embedded into the nwell 102. A highly doped p-active collector 106 is embedded into a substrate 108 and a depletion region 110 wherein photoconversion takes place separates the nwell 102 from the substrate 108. In yet another embodiment of a phototransistor type photodetector 40,42, an npn-phototransistor 112 is provided as shown in FIG. 5E. Included in the npn-phototransistor 112 are a highly doped n-active emitter 114 which is embedded into a slightly p-doped base 116. The base 116, in turn, is embedded into a slightly n-doped nwell 118. The npn-phototransistor 112 also includes a highly doped n-active collector (sinker) 120 which is connected to a buried layer 122. If desired, the base 116 can have a highly doped p-active base lead 124. A substrate 126 is provided to support this structure and a depletion region 128 is provided between the nwell 118 and the base 116 where photoconversion will take place.

Figure 6:
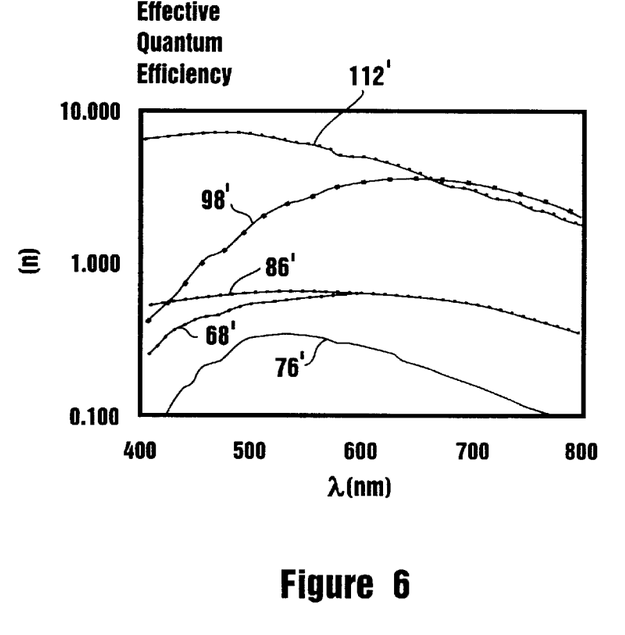
FIG. 6 is a graph showing plots of wavelength vs. quantum efficiency for each of the photocells shown in FIGS. 4A–E.

In FIG. 6 the effective quantum efficiencies for the various photodetectors 40,42 (68, 76, 86, 98 and 112) are shown in FIGS. 5A–E with respect to the incident photon wavelengths in focal point 52. As shown in the FIG. 6, the peak value of each curve corresponds to the maximum of effective quantum efficiency of the respective photodetector (68, 76, 86, 98 and 112) and, therefore, gives a selection specification for the photodetectors 40,42 according the particular application of the device 10. For example, a near ultraviolet application will motivate the implementation of the npn-phototransistor 112, whereas a near infrared application will motivate the implementation of the nplus-photodiode 68 or the nwell-photodiode 88. Both the pnp-phototransistor 98 and the npn-phototransistor 112 offer a gained photocurrent (compared to the photodiodes) but they suffer from long charge carrier base transit times and, accordingly have a slow transient response. Thus, for different applications with different specification concerning photosensitivity and repetition rates, different photodetectors 40,42 may be used.

Figure 7:
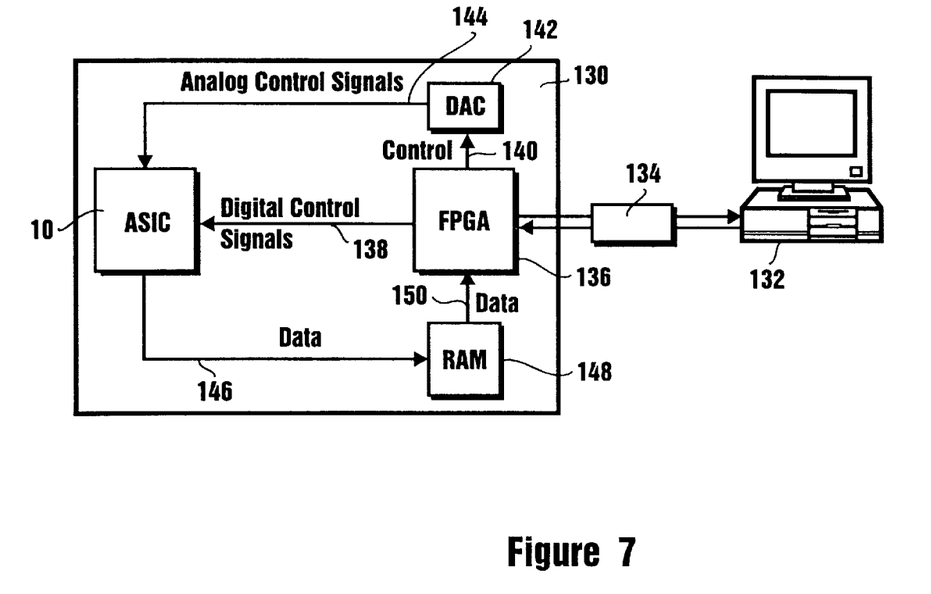
FIG. 7 is a schematic view of a control configuration for the present invention.

Referring now to FIG. 7, it can be seen that an architecture for the device 10 of the present invention provides for the device 10 to be mounted on a printed circuit board 130 and controlled by a computer 132. Specifically, the computer 132 is connected via an interface 134 with a field programmable gate array (FPGA) 136 which is mounted on the printed circuit board 130. With this connection digital control signals from the computer 132 and FPGA 136 can be sent directly to the device 10 via a line 138. Also, digital control signals can be sent from the FPGA 136 via a line 140 to a digital/analog converter 142, and analog control signals can then be sent to the device 10 via a line 144. For the present invention, wavefront data collected by the ASIC device 10 is sent via a line 146 to a random access memory (RAM) 148 for subsequent transfer via a line 150 to the FPGA 136. The data is then sent from the FPGA 136 to the computer 132 where a least square fit for calculation of the mathematical description of the wavefront phase information is performed.

While the particular Application Specified Integrated Circuit For Use in Wavefront Detection as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for detecting a wavefront defined by a plurality of contiguous light beams which comprises:

an optical means for isolating each individual said light beam of said plurality of light beams;

an optical means for focusing each individual said light beam to a focal point in an x-y plane;

a plurality of clusters, each said cluster including a plurality of rows and a plurality of columns with each row having a plurality of pixels aligned in an x-direction and each column having a plurality of pixels aligned in a y-direction, and wherein each said pixel includes a first photodetector for generating a first electrical current in response to an illumination thereof by said focal pint and a second photodetector for generating a second electrical current in response to an illumination thereof by said focal point;

a plurality of first electronic circuits for summing said first electrical currents generated by said first photodetectors in each row to generate a respective y-signal for said row;

a plurality of second electronic circuits for summing said second electrical currents generated by said second photodetectors in each column to generate a respective x-signal for said column;

an electronic means for receiving said x-signals and said y-signals from said cluster to determine an x-y position for said focal point of said individual light beam incident on said cluster; and a computer means for comparing respective said x-y positions of said plurality of focal points of said plurality of light beams for detection of said wavefront.

2. A device as recited in claim 1 wherein said optical isolating means is an array of lenslets, and said optical focusing means is an individual lenslet in said array of lenslets.

3. A device as recited in claim 1 wherein said first photodetector and said second photodetector are photodiodes.

4. A device as recited in claim 1 wherein said first photodetector and said second photodetector are phototransistors.

5. A device as recited in claim 1 wherein said electronic means converts a plurality of said x-signals from a plurality of said pixels into a representative digital x-signal and said electronic means converts a plurality of said y-signals from a plurality of said pixels into a representative digital y-signal.

6. A device as recited in claim 1 further comprising a substrate and said plurality of clusters and said electronic means are mounted on said substrate.

7. A device as recited in claim 1 wherein said first photodetectors of contiguous said pixels are aligned in said y-direction.

8. A device as recited in claim 1 wherein one said first photodetector of one said pixel alternates in alignment with one said second photodetector of another said pixel in said y-direction.

9. A device as recited in claim 1 wherein said first electronic circuit is a first wire connected to said first photodetectors in said row for receiving said first electrical currents, and wherein said second electronic circuit is a second wire connected to said second photodetectors in said column for receiving said second electrical currents.

10. A device for detecting a wavefront defined by a plurality of contiguous light beams which comprises:

a means for separating a wavefront into a plurality of contiguous light beams;

a means for focusing each said light beam of said wavefront to a respective focal point in an x-y plane;

a plurality of photocells positioned in said x-y plane, and arranged as a plurality of rows in the x direction and a plurality of columns in the y direction, with each said photocell being responsive to light of a respective said focal point incident thereon to generate an electrical current;

a plurality of first electronic circuits for summing said electrical currents in each respective said row of said cluster to generate a respective y-signal for said row;

a plurality of second electronic circuits for summing said electrical currents in each respective said column to generate a respective x-signal for said column;

a means for receiving said x-signals and said y-signals to determine a respective x-y position for each said respective focal point in said x-y plane; and a means for comparing respective said x-y positions of said plurality of focal points of said plurality of light beams for detection of said wavefront.

11. A device as recited in claim 10 wherein said plurality of photocells are divided into a plurality of clusters and each said cluster includes a plurality of rows and a plurality of columns with each row having a plurality of pixels aligned in an x-direction and each column having a plurality of pixels aligned in a y-direction, and wherein each said pixel includes a first photocell for generating an x-signal in response to an illumination thereof by said focal point and a second photocell for generating a y-signal in response to an illumination thereof by said focal point.

12. A device as recited in claim 11 wherein said first photocell and said second photocell are photodiodes.

13. A device as recited in claim 11 wherein said first photocell and said second photocell are phototransistors.

14. A device as recited in claim 11 wherein said separating means is an array of lenslets, and said focusing means is an individual lenslet in said array of lenslets.

15. A device as recited in claim 11 further comprising an electronic means for converting a plurality of said x-signals from a plurality of said pixels into a representative digital x-signal and for converting a plurality of said y-signals from a plurality of said pixels into a representative digital y-signal.

16. A device as recited in claim 15 further comprising a substrate wherein said plurality of clusters and said electronic means are mounted on said substrate.

17. A method for using a device to detect a wavefront defined by a plurality of contiguous light beams which comprises the steps of:

separating a wavefront into a plurality of contiguous light beams;

focusing each said light beam of said wavefront to a respective focal point in an x-y plane;

positioning a plurality of clusters mounted on said device in said x-y plane, each said cluster including a plurality of rows and a plurality of columns with each row having a plurality of pixels aligned in an x-direction and each column having a plurality of pixels aligned in a y-direction, and wherein each said pixel includes a first photocell for generating a first electrical current in response to an illumination thereof by said focal point and a second photocell for generating a second electrical current in response to an illumination thereof by said focal point;

summing said first electrical currents in each said row with a first electronic circuit to generate a y-signal for said row;

summing said second electrical currents in each said column with a second electronic circuit to generate an x-signal for said column;

receiving said x-signals and said y-signals from said cluster with an electronic means mounted on said device to determine an x-y position for said focal point of said individual light beam incident on said cluster; and using a computer means mounted on said device to compare respective said x-y positions of said plurality of focal points of said plurality of light beams for detection of said wavefront.

18. A method as recited in claim 17 further comprising the steps of:

converting a plurality of said x-signals from a plurality of said pixels into a representative digital x-signal; and converting a plurality of said y-signals from a plurality of said pixels into a representative digital y-signal.

19. A method as recited in claim 17 wherein said light beams have an ultraviolet wavelength and said method further comprises the step of selecting phototransistors for use as said first photocells and said second photocells.

20. A method as recited in claim 19 wherein said light beams have an infrared wavelength and said method further comprises the step of selecting photodiodes for use as said first photocells and said second photocells.

21. A method as recited in claim 17 further comprising the step of aligning said first photocells of contiguous said pixels in said y-direction.

* * * * *